(12) United States Patent
Dage et al.

(10) Patent No.: US 6,347,746 B1
(45) Date of Patent: Feb. 19, 2002

(54) TEMPERATURE AND HUMIDITY SENSOR ASSEMBLY

(75) Inventors: Gerhard Allan Dage, Franklin; John David Hoeschele, Detroit; Leighton Ira Davis, Jr., Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/518,517

(22) Filed: Mar. 3, 2000

(51) Int. Cl.[7] ............................. B01F 3/02; G05D 21/00
(52) U.S. Cl. ............ 236/44 C; 62/176.6; 236/DIG. 19
(58) Field of Search ...................... 236/44 A, 44 C, 236/44 R, DIG. 19, 91 C, DIG. 13; 62/176.6

(56) References Cited

U.S. PATENT DOCUMENTS

| | | |
|---|---|---|
| 4,424,933 A | 1/1984 | Sutoh et al. ............... 236/44 A |
| 4,896,589 A | 1/1990 | Takahashi ............... 62/176.6 X |
| 4,920,755 A | 5/1990 | Takahiro ...................... 62/171 |
| 5,008,775 A * | 4/1991 | Schiwdler et al. ... 236/DIG. 19 |
| 5,351,855 A | 10/1994 | Nelson et al. ............. 236/44 C |
| 5,377,528 A * | 1/1995 | Dauvergne ................ 454/75 X |
| 5,516,041 A | 5/1996 | Davis, Jr. et al. ........... 236/49.3 |
| 5,533,348 A * | 7/1996 | Baldwin et al. ............... 62/129 |
| 5,651,498 A | 7/1997 | Meyer et al. ............. 236/44 C |
| 5,971,066 A | 10/1999 | Oehring et al. ............. 165/202 |
| 6,102,296 A * | 8/2000 | Snider ........................ 236/49.3 |

FOREIGN PATENT DOCUMENTS

JP    403164648 A  *  7/1991  .......... 236/DIG. 19

* cited by examiner

Primary Examiner—William Wayner
(74) Attorney, Agent, or Firm—Larry I. Shelton

(57) ABSTRACT

A temperature and humidity sensor assembly for a heating, ventilation and air conditioning (HVAC) system of a vehicle includes a housing for connection to the HVAC system. The temperature and humidity sensor also includes a humidity sensor disposed within the housing and a temperature sensor disposed within the housing. The temperature and humidity sensor further includes a circuit board disposed in the housing and electrically connected to the humidity sensor and the temperature sensor and for connection to an electronic controller to control the HVAC system.

20 Claims, 3 Drawing Sheets

TEMPERATURE AND HUMIDITY SENSOR ASSEMBLY

BACKGROUND OF THE INVENTION

1. Field of the Invention

The present invention relates generally to heating, ventilating and air conditioning (HVAC) systems of vehicles and, more specifically, to a temperature and humidity sensor for a HVAC system in a vehicle.

2. Description of the Related Art

It is known that a fundamental goal of a HVAC system for a vehicle is to detect and avoid windshield/window fogging conditions. In an attempt to measure and control the many variables that affect fogging, modern HVAC systems have many sensors and control actuators. A typical HVAC system might have a temperature sensor inside an occupant compartment or cabin of the vehicle, one measuring ambient temperature outside and others measuring various temperatures of the HVAC system internal workings. The occupant may have some input to the HVAC system via a set point or other adjustment. Additional sensors measuring sun heating load, humidity, etc. might be available to the HVAC system. The set of actuators might include a variable speed blower, some means for varying air temperature—including cooling and thereby extracting moisture from the air, ducting and doors to control the direction of air flow and the ratio of fresh intake air to recirculated air.

It is known how to provide a method and control system for controlling the HVAC system to prevent fogging. Such a method and control system is disclosed in U.S. Pat. No. 5,516,041 to Davis, Jr. et. al., the disclosure of which is hereby incorporated by reference. In this patent, the method and control system uses fuzzy logic to prevent fogging. The control system responds to signals generated by various climate control sensors including a humidity sensor to produce a desired vehicle air temperature and airflow to detect and avoid incipient windshield/window fog conditions. Fuzzy logic and calculations are performed based on fuzzy rules and membership functions to provide nonlinear compensation. The fog boundary is mapped out empirically.

Current electronic air temperature controllers (EATCs) do not have the capability to determine if the windshield is fogging or about to fog. Therefore, it is desirable to provide a temperature and humidity sensor assembly to allow an EATC to determine when fogging will occur and take appropriate climate control system actions to avoid windshield fogging or misting. It is also desirable to provide a temperature and humidity sensor assembly supplied with aspirated cabin air to allow absolute cabin humidity to be monitored. Therefore, there is a need in the art to provide a temperature and humidity sensor assembly that accomplishes these desires.

SUMMARY OF THE INVENTION

Accordingly, the present invention is a temperature and humidity sensor assembly for a heating, ventilation and air conditioning (HVAC) system of a vehicle. The temperature and humidity sensor assembly includes a housing for connection to the HVAC system. The temperature and humidity sensor also includes a humidity sensor disposed within the housing and a temperature sensor disposed within the housing. The temperature and humidity sensor further includes a circuit board disposed in the housing and electrically connected to the humidity sensor and the temperature sensor and for connection to an electronic controller to control the HVAC system.

One advantage of the present invention is that a temperature and humidity sensor assembly is provided to allow an EATC to determine when fogging will occur and take action to prevent it. Another advantage of the present invention is that the temperature and humidity sensor is supplied with aspirated cabin air to allow absolute cabin humidity to be monitored. Yet another advantage of the present invention is that the temperature and humidity sensor assembly has a capacitive humidity sensor packaged in combination with an incar temperature thermistor that has aspirated air from the cabin of the vehicle drawn across it. Still another advantage of the present invention is that the temperature and humidity sensor assembly has an output that is read by an EATC and is used by various strategies to improve comfort, reduce fogging and improve fuel economy of the vehicle. A further advantage of the present invention is that the temperature and humidity sensor assembly has two sensors sampling the same parcel of air to allow the HVAC system to infer absolute humidity and dew point.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
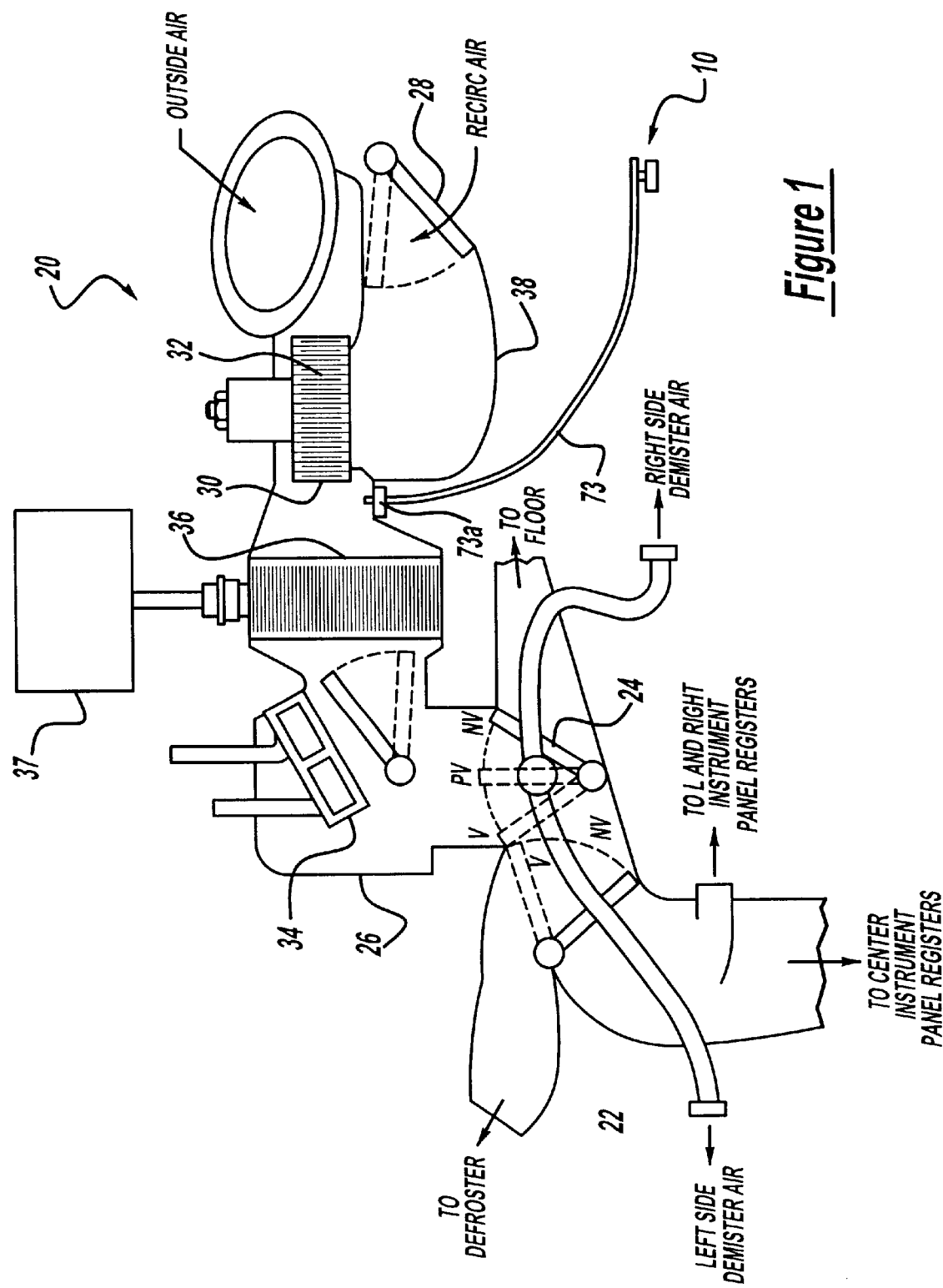
FIG. 1 is a diagrammatic view of a heating, ventilating, air conditioning (HVAC) system incorporating a temperature and humidity sensor assembly, according to the present invention.
Figure 2:
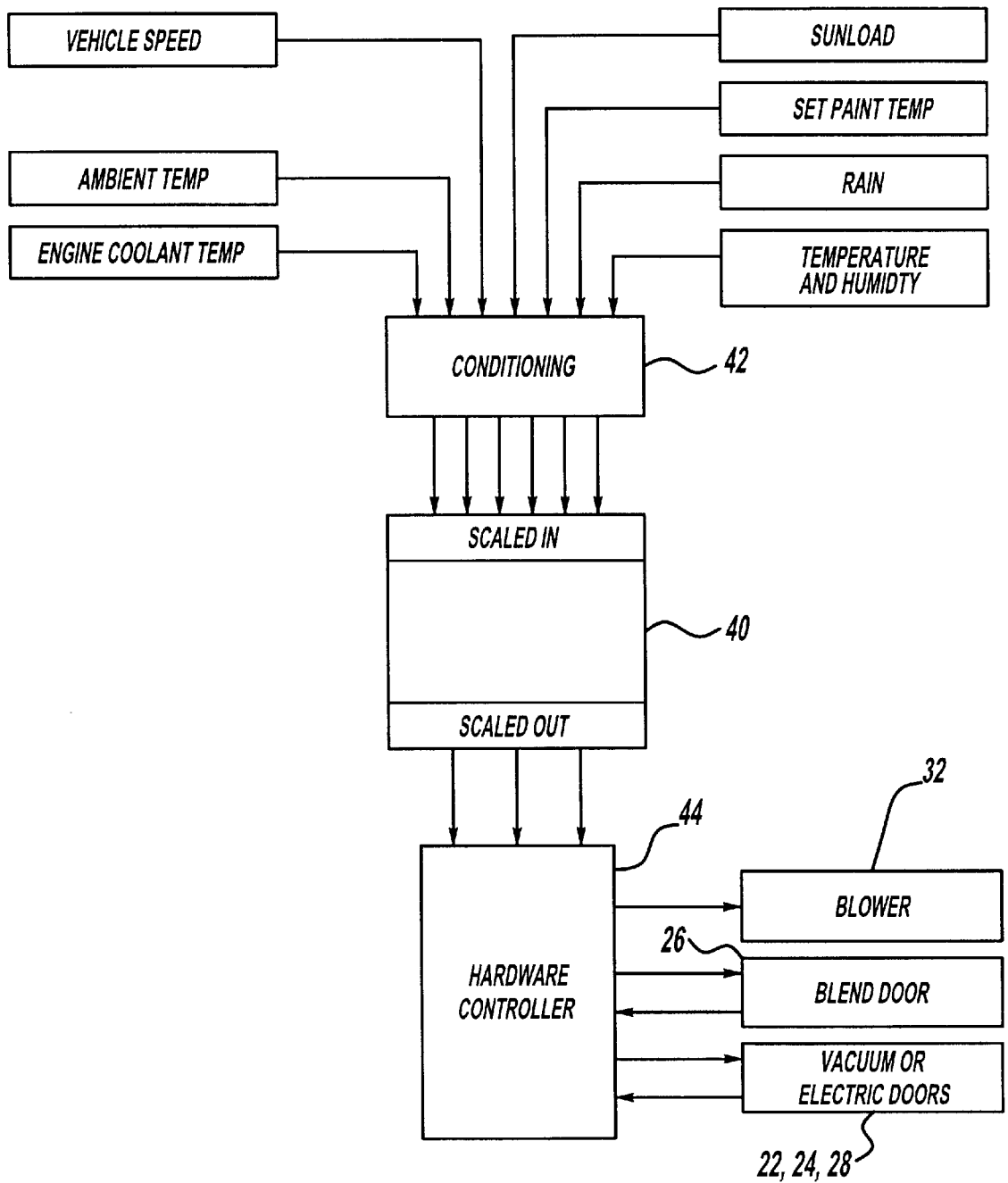
FIG. 2 is a schematic block diagram of a control system, according to the present invention, incorporating the temperature and humidity sensor assembly for the HVAC system of FIG. 1.

Referring to the drawings and in particular FIGS. 1 and 2, one embodiment of an air handling system of a heating, ventilation and air conditioning (HVAC) system 20 for a vehicle (not shown) is illustrated. In general, control of air temperature and airflow (and, to a lesser extent, humidity) within the vehicle is accomplished using various actuators to affect the temperature and flow of air supplied to a cabin or occupant compartment of the vehicle. The HVAC system 20 includes an arrangement of air flow doors, including panel-defrost, floor-panel, temperature blend and outside recirculated air actuators or doors 22, 24, 26 and 28, respectively. The doors 22 and 24 are driven by vacuum or electric motors (not shown) between their various positions in a conventional manner as illustrated in FIG. 1. The door 26 is driven by an electric servomotor (not shown) also in a conventional manner. The door 28 may also be driven by an electric servomotor so that the position of the door 28 is continuously variable.

The HVAC system 20 also includes a variable speed blower motor or fan 30 including a blower wheel 32. The HVAC system 20 includes heating and cooling elements such as a heater core 34 and an evaporator core 36 in a typical vehicle air conditioning plant including a compressor 37. Each of the above components is in communication with the HVAC case and associated ducting 38 in order to control temperature, the direction of airflow and the ratio of fresh or intake air to recirculated air.

For automatic control of the temperature and flow of air in the cabin, conditions within and outside the cabin are monitored by sensors and an electronic controller 40 to be described generates signals to control the plant actuators according to the conditions as indicated by the sensors. The evaporator temperature is controlled in a conventional automatic fashion to allow the HVAC system 20 to dehumidify air moving thereover.

As illustrated in FIG. 2, a typical complement of sensors of the HVAC system 20 provide signals which are representative of interior air temperature (in-car), ambient (outside) air temperature, engine coolant temperature (ECT), vehicle speed (VS), rain intensity, humidity and sunload. The temperature and humidity sensor 10 provides signals of the incar or interior air temperature and humidity. In addition, there is a set signal or set temperature value indicating the desired temperature that is set manually by the operator of the vehicle.

The signals are provided to an electronic controller 40 as inputs after being conditioned by a conditioning circuit 42. The electronic controller 40 scales the input signals and provides scaled output signals for use by a hardware controller 44 which, in turn, controls the doors 22 through 28 and the blower 32 to regulate the temperature and flow of air and ultimately to prevent fogging of a window pane or windshield of the vehicle. Blend door position is fed back to the hardware controller 44 as indicated by a return arrow. The hardware controller 44 also receives signals from the ignition switch (not shown) and the HVAC system 20 to indicate the operating of the switch and the HVAC system 20. The hardware controller 44 preferably continually monitors the state of the ignition switch and the state of the HVAC system 20. It should be appreciated that the HVAC system 20 is similar to that disclosed in U.S. Pat. No. 5,516,041 to Davis, Jr. et al., the disclosure of which is hereby incorporated by reference.

The temperature and humidity sensor assembly 10 of the present invention involves the combination of a capacitive humidity sensor and incar temperature thermistor, suitable for use by the electronic controller 40. Humidity information from the humidity sensor and temperature information from the temperature thermistor of the temperature and humidity sensor assembly 10, in combination with information already available to the electronic controller 40 (ambient temperature, blower speed, etc.) allows the calculation of a degree of likelihood of windshield/window fogging of the windshield.

Figure 3:
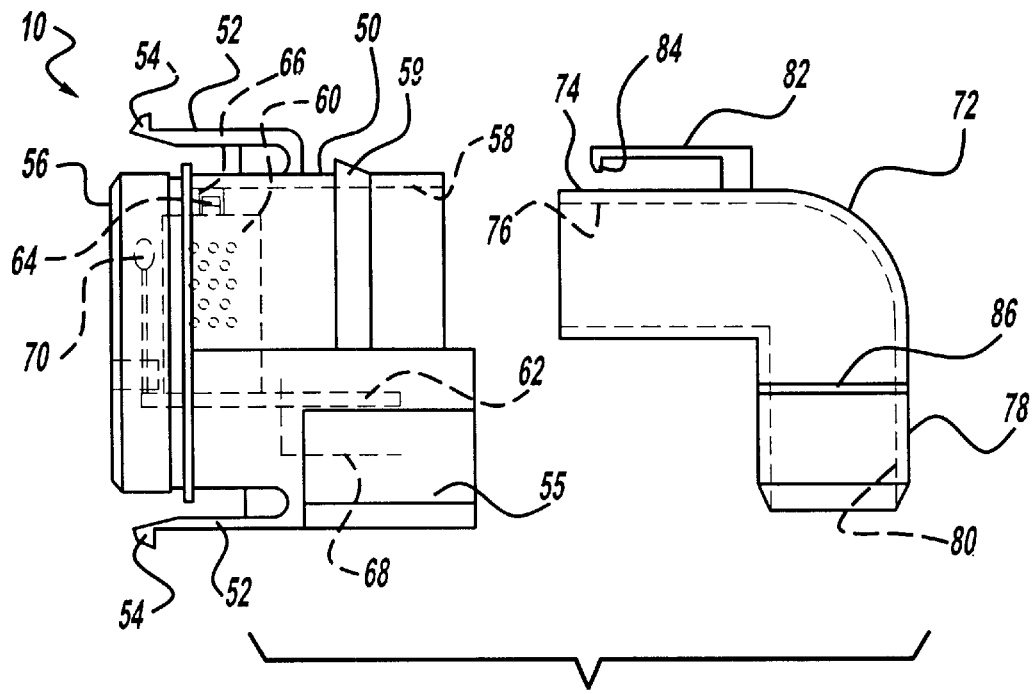
FIG. 3 is an exploded elevational view of the temperature and humidity sensor for the HVAC system of FIG. 1.

Referring to FIG. 3, the temperature and humidity sensor assembly 10 includes a housing 50. The housing 50 is generally tubular in shape and extends axially. The housing 50 has a pair of opposed arms 52 extending axially and a projection 54 extending radially at an end of the arms 54. The arms 54 are deflectable to allow the housing 50 to be snap-fit and secured in an aperture (not shown) in an instrument panel (not shown) of the vehicle. The housing 50 may have a cavity 55 to allow an electrical connector (not shown) to be attached to a circuit board 62 to be described. The housing 50 also has an inlet 56 at one axial end and an outlet 58 at the other axial end. The housing 50 has a flange 59 extending radially from an outer periphery thereof near the outlet 58 of the housing 50 for a function to be described. The housing 50 is made of a plastic material. The housing 50 is formed by conventional injection molding and is integral, unitary and one-piece.

The temperature and humidity sensor assembly 10 includes a humidity sensor 60 disposed in the housing 50. The humidity sensor 60 is of a capacitive type and is conventional and known in the art. The temperature and humidity sensor assembly 10 also includes a circuit board 62 disposed in the housing 50 and supporting the humidity sensor 60. The circuit board 62 is of a printed circuit type and is conventional and known in the art. The humidity sensor 60 has a projection 64 extending radially at a top thereof which is disposed in a corresponding recess 66 of the housing 50 such that the humidity sensor 60 is supported by the circuit board 62 from the bottom and the projection 64 and recess 66 at the top. The circuit board 62 has at least one terminal 68 extending into the cavity 55 of the housing and is electrically connected to the electronic controller 40 by suitable means such as an electrical connector (not shown). The temperature and humidity sensor assembly 10 also includes a temperature sensor 70 disposed in the housing 50 and electrically connected to the circuit board 62. The temperature sensor 70 is of a thermistor type and is conventional and known in the art. It should be appreciated that the temperature sensor 70 and humidity sensor 60 are disposed near the inlet 56 of the housing 50.

The temperature and humidity sensor assembly 10 further includes an adapter 72 for connection to the outlet 58 of the housing 50 and an aspirator hose 73 (FIG. 1), which is connected or attached to an electrical or motorized aspirator 73a on the HVAC system (FIG. 1). The adapter 72 is generally tubular and has an elbow shape. The adapter 72 has an inlet end 74 having an inlet 76 and disposed in the outlet 58 of the housing 50. The adapter 72 also has an outlet end 78 having an outlet 80 and connected to the aspiration hose. The adapter 72 has an arm 82 extending axially at the inlet end 74 and having a projection 84 extending radially inward. The arm 82 is deflectable to allow the projection 84 to be disposed past the flange 59 of the housing 50 to secure the adapter 72 to the housing 50. The adapter 72 includes an annular groove 86 in the outlet end 78 to allow the aspirator hose 73 to be secured thereto. It should be appreciated that the aspiration hose is further secured by a clamp (not shown) to the outlet end 78 of the adapter 72.

In operation of the temperature and humidity sensor assembly 10, the adapter 72 is connected to the housing 50. The housing 50 is disposed in the instrument panel of the vehicle. The aspirator hose 73 is connected to the outlet end of the adapter 72 and the aspirator 73a. The temperature sensor 70 senses or measures the cabin temperature and humidity sensor 60 senses or measures the relative humidity inside the cabin. The signals from the sensors 60 and 70 are sent to the electronic controller 40. It should be appreciated that an anti-fog strategy is implemented based on the use of the cabin humidity sensor 60 and temperature sensor 70.

Given the ability to detect incipient fog conditions, and a measure of the degree or likelihood of fogging via fog probability, a strategy may be established for avoiding these conditions by taking appropriate control action. As fog probability increases, the speed of the blower 32 is increased proportionally. At some low threshold, the air conditioning (A/C) clutch (not shown) is turned on, if it is not already; likewise, the fresh/recirculation door 28 is put in fresh mode. At an intermediate fog probability, for example 50%, the air distribution mode is changed to put more discharge air on the windshield. If the current mode is floor, floor/defrost mode is chosen; if the current mode is floor/defrost or any other, defrost mode is chosen. At a high threshold of fog probability, for example 90%, the defrost air distribution mode is chosen exclusively. The use of increased blower and more windshield-directed modes can be quite effective for alleviating windshield fog without affecting comfort. However, above 100% fog probability, the blower 32 continues to ramp up strongly and heat is added to the strategy. It should be appreciated that the method is carried out on the electronic controller 40.

Figure 4:
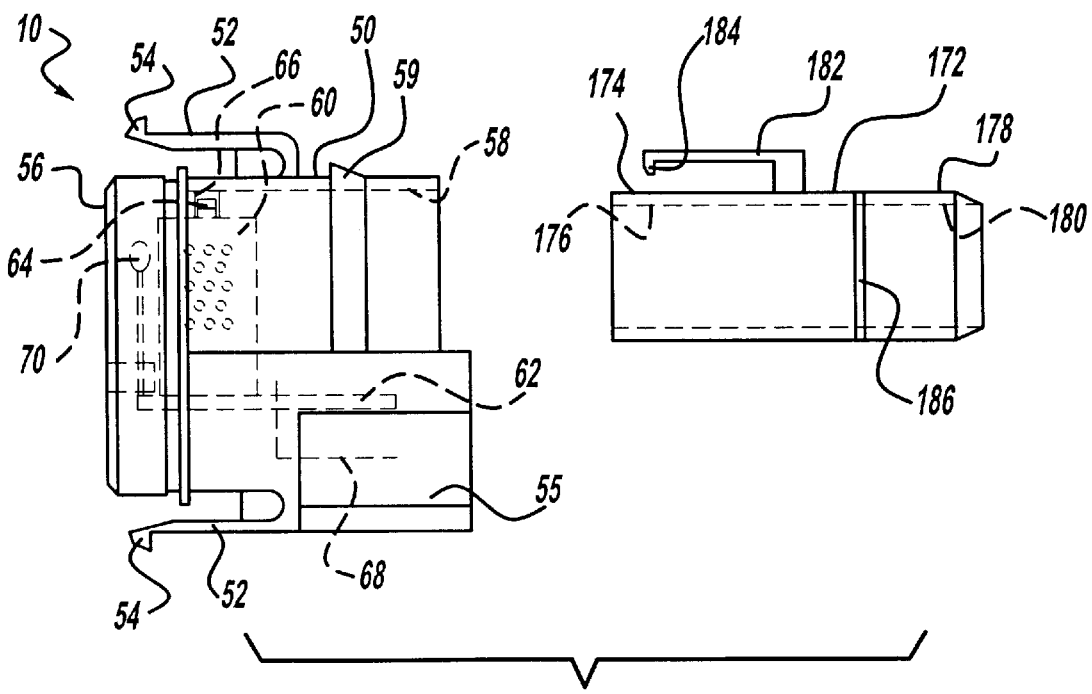
FIG. 4 is an exploded elevational view of another embodiment, according to the present invention, of the temperature and humidity sensor for the HVAC system of FIG. 1.

Referring to FIG. 4, another embodiment 172, according to the present invention, of the adapter 72 is shown. Like parts of the adapter 72 have like reference numerals increased by one hundred (100). In this embodiment, the adapter 172 extends axially or is straight. The adapter 172 operates similar to the adapter 72.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A temperature and humidity sensor assembly for a heating, ventilation and air conditioning (HVAC) system of a vehicle, comprising:

a housing for connection to the HVAC system;

a humidity sensor disposed within said housing;

a temperature sensor disposed within said housing;

a circuit board disposed in said housing and electrically connected to said humidity sensor and said temperature sensor and for connection to an electronic controller to control the HVAC system; and an aspiration hose operatively connected to said housing and for connection to an aspirator on the HVAC system.

2. A temperature and humidity sensor assembly as set forth in claim 1 wherein said housing is tubular and has an inlet and an outlet.

3. A temperature and humidity sensor assembly as set forth in claim 2 wherein said temperature sensor and said humidity sensor is disposed near said inlet.

4. A temperature and humidity sensor assembly as set forth in claim 1 wherein said humidity sensor is of a capacitive type.

5. A temperature and humidity sensor assembly as set forth in claim 1 wherein said temperature sensor is of a thermistor type.

6. A temperature and humidity sensor assembly for a heating, ventilation and air conditioning (HVAC) system of a vehicle, comprising:

a housing for connection to the HVAC system;

a humidity sensor disposed within said housing;

a temperature sensor disposed within said housing;

a circuit board disposed in said housing and electrically connected to said humidity sensor and said temperature sensor and for connection to an electronic controller to control the HVAC system; and wherein said housing has a plurality of arms extending axially and a projection extending radially near an end of said arms.

7. A temperature and humidity sensor assembly for a heating, ventilation and air conditioning (HVAC) system of a vehicle, comprising:

a housing for connection to the HVAC system;

a humidity sensor disposed within said housing;

a temperature sensor disposed within said housing;

a circuit board disposed in said housing and electrically connected to said humidity sensor and said temperature sensor and for connection to an electronic controller to control the HVAC system; and wherein said housing has an annular flange extending radially outwardly.

8. A temperature and humidity sensor assembly as set forth in claim 7 including an adapter connected to said housing and for connection to an aspiration hose.

9. A temperature and humidity sensor assembly as set forth in claim 8 wherein said adapter is tubular and elbow shaped.

10. A temperature and humidity sensor assembly as set forth in claim 8 wherein said adapter is tubular and straight shaped.

11. A temperature and humidity sensor assembly as set forth in claim 8 wherein said adapter has at least one arm extending axially and a projection extending radially near an end of said at least one arm for cooperating with said flange on said housing.

12. A temperature and humidity sensor assembly for a heating, ventilation and air conditioning (HVAC) system of a vehicle, comprising:

a housing for connection to the HVAC system, said housing is tubular and has an inlet and an outlet;

an adapter connected to said housing and for connection to an aspiration hose;

a humidity sensor disposed within said housing;

a temperature sensor disposed within said housing; and a circuit board disposed in said housing and electrically connected to said humidity sensor and said temperature sensor and for connection to an electronic controller to control the HVAC system.

13. A temperature and humidity sensor assembly as set forth in claim 12 wherein said temperature sensor and said humidity sensor is disposed near said inlet.

14. A temperature and humidity sensor assembly as set forth in claim 12 wherein said humidity sensor is of a capacitive type.

15. A temperature and humidity sensor assembly as set forth in claim 12 wherein said temperature sensor is of a thermistor type.

16. A temperature and humidity sensor assembly as set forth in claim 12 wherein said housing has a plurality of arms extending axially and a projection extending radially near an end of said arms.

17. A temperature and humidity sensor assembly as set forth in claim 12 including wherein said housing has an annular flange extending radially outwardly.

18. A temperature and humidity sensor assembly as set forth in claim 12 wherein said adapter is tubular and elbow shaped.

19. A temperature and humidity sensor assembly as set forth in claim 12 wherein said adapter is tubular and straight shaped.

20. A temperature and humidity sensor assembly for a heating, ventilation and air conditioning (HVAC) system of a vehicle, comprising:

a housing for connection to the HVAC system, said housing is tubular and has an inlet and an outlet;

an adapter connected to said outlet of said housing and for connection to an aspiration hose;

a humidity sensor disposed within said housing near said inlet;

a temperature sensor disposed within said housing near said inlet; and a circuit board disposed in said housing and electrically connected to said humidity sensor and said temperature sensor and for connection to an electronic controller to control the HVAC system.

* * * * *